INVENTOR
JOSEPH W. WETMORE
ATTORNEYS

Dec. 7, 1965   J. W. WETMORE   3,221,549
AIRCRAFT INSTRUMENT
Filed Nov. 9, 1962   4 Sheets-Sheet 2

INVENTOR
JOSEPH W. WETMORE

BY

ATTORNEYS

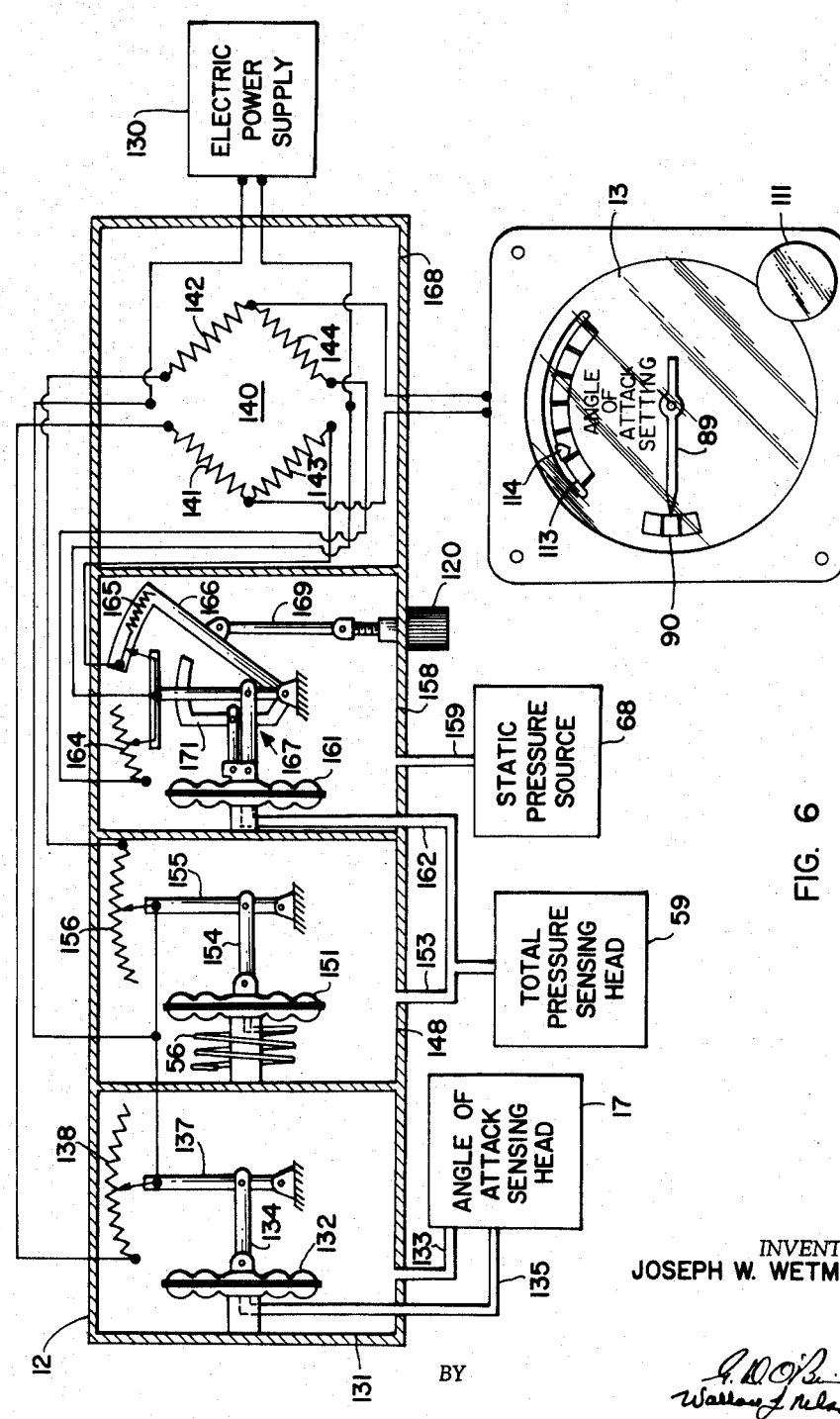

United States Patent Office 3,221,549
Patented Dec. 7, 1965

3,221,549
AIRCRAFT INSTRUMENT
Joseph W. Wetmore, Hampton, Va., assignor to the United States of America as represented by the Administrator of the National Aeronautics and Space Administration
Filed Nov. 9, 1962, Ser. No. 236,748
11 Claims. (Cl. 73—178)
(Granted under Title 35, U.S. Code (1952), sec. 266)

The invention described herein may be manufactured and used by or for the Government of the United States of America for governmental purposes without the payment of any royalties thereon or therefor.

This invention relates generally to an aircraft instrumentation system. More particularly, this invention relates to a single aircraft instrument whereby the pilot, by control of aircraft speed and rotation during takeoff to maintain a substantially fixed reading of the instrument, will cause his aircraft to rotate in takeoff attitude at the proper speed and thereafter to follow a near-optimum climbout path. The instrument of the present invention provides all the advantages of angle-of-attack indication for controlling takeoff rotation, combines with this indication a rate-of-change-of-total-pressure, and eliminates the low-frequency, poorly damped, and possibly large amplitude phugoid oscillation of the flight path which can occur with angle-of-attack indications alone.

The inability of an aircraft pilot to employ external visual reference points due to unfavorable weather or lighting conditions in the operation of present-day aircraft increases the difficulty of establishing proper takeoff climb. By the use of present-day aircraft instrumentation, the pilot must be able to promptly interpret and react to the indications of several instruments such as airspeed, altitude, rate of climb, and attitude. The attitude indicator is not reliable with the pitch direction after having been under the effect of prolonged longitudinal acceleration during the takeoff run which further increases the hazards of presently used aircraft instrumentation. In addition, existing high-speed aircraft have magnified the problem, since the high speeds result in greater altitude changes in a given time for a given flightpath angle change. The takeoff problem could be more critical with some of the presently proposed supersonic aircraft configurations which require large rotation angles to develop sufficient lift. The location of the pilot ahead of the aircraft center of gravity, as is common in present-day design, also has a serious effect on his ability to rotate quickly and precisely to the required angle by judgment based only on feel and visual cues. It is therefore imperative to employ instruments to aid the pilot in controlling the takeoff rotation of supersonic aircraft and such instruments are currently being used on some present-day turbo jet transports for this purpose. It would be very desirable, however, to combine these instruments into a single indicator which could be used as an aid in establishing close control of the flightpath during the takeoff and climbout, in particular. An angle-of-attack indication alone serves as an aid in controlling aircraft rotation; however, during the climbout it does not provide a sufficient reference because of its inability to indicate the presence of the phugoid mode. The phugoid or long-period mode is characterized by large amplitude changes in altitude and airspeed while the angle of attack remains essentially constant.

One prior art instrument has been designed to combine these various functions. It employs an accelerometer in conjunction with a gyroscope to provide a phugoid-damping bias on the angle-of-attack indication, which obviously requires complex mechanical elements as well as complex electrical circuitry in order to perform its function.

An object of the present invention is therefore to provide a simple single instrument to enable the pilot, by keeping a fixed reading on this instrument, to control takeoff and climbout of his aircraft.

Another object of the present invention is to provide an instrument which eliminates low-frequency, poorly damped, and large amplitude phugoid oscillation of an aircraft flightpath.

A further object of the invention is to provide an instrument whereby the pilot is able to control a vertical plane flightpath of his aircraft in poor visibility conditions.

An additional object of the present invention is to provide a single indicator instrument to enable the pilot to control his aircraft in the vertical plane throughout the takeoff roll, rotation to lift-off angle of attack and climbout.

A still further object of the present invention is to provide an instrument for use in piloted aircraft that combines angle of attack with rate of change of total pressure encountered during aircraft operation into a single indication for optimum aircraft operation.

According to one aspect of the present invention, the foregoing and further objects are attained by providing a single instrument composed entirely of pneumatic and mechanical components, except for an electrical servomotor drive for positioning an angle-of-attack sensing head, and self-synchronizing motors for indicating the angle-of-attack head position. The primary sensing means of the present system is an angle-of-attack sensing head consisting of a cylinder projecting laterally from the side of the aircraft fuselage into the airstream and containing two slots parallel to the axis of the cylinder and spaced 60° to 90° apart around the circumference of the cylinder. With the airstream direction perpendicular to the cylinder at a point on the circumference midway between the slots, the pressure exerted by the airstream at the two sets of openings would be equal, but for any other direction of the perpendicular airstream component the pressures would be different, thereby providing the angle-of-attack sensing capability. The interior of the sensing head is divided into two longitudinal extending chambers with one of the slots opening into each chamber and with a flexible conduit connecting to each chamber and leading to the interior of each of the two pressure-responsive aneroid units mounted within the instrument housing. These pressure-responsive aneroid units consist of identical conventional flexible-diaphragm walled cells arranged so that the respective movable faces are adjacent and rigidly connected to one another. This rigid connection then moves in response to, and in proportion to, any differences in the pressure present in the interiors of the two cells, thereby responding to variations of the airflow at the angle-of-attack sensing head. Thus, either an increase or decrease in angle of attack will move the diaphragms and the inner connection therebetween in a predetermined direction.

A third or total pressure-rate-responsive aneroid unit is also provided within the instrument housing and connected to a suitable total pressure-responsive source. A fourth aneroid unit comprises a rotation programing unit and is provided with sensing capabilities to correlate the movement of the flexible wall in this unit in relation to the forward speed of the aircraft.

Each of the aforementioned aneroid units is mechanically connected through a system of links and levers to a summing linkage where the outputs from each of these units, as a result of the pressure input functions received thereby, are summed and transmitted to an indicator hand provided on the instrument face. The pilot can therefore, by controlling his aircraft to maintain a fixed reading of the indicator on the instrument dial during takeoff, cause the aircraft to rotate to takeoff attitude at the proper speed and, thereafter to follow a near-optimum climbout path.

A more complete appreciation of the invention and many of the attendant advantages thereof will be readily appreciated as the same becomes better understood by reference to the following detailed description when considered in connection with the accompanying drawings wherein:

FIG. 6 is a schematic diagram of a modification according to the present invention employing electronic circuitry for coordinating the inputs received by the various pressure-responsive units in the instrument.

Figure 1:
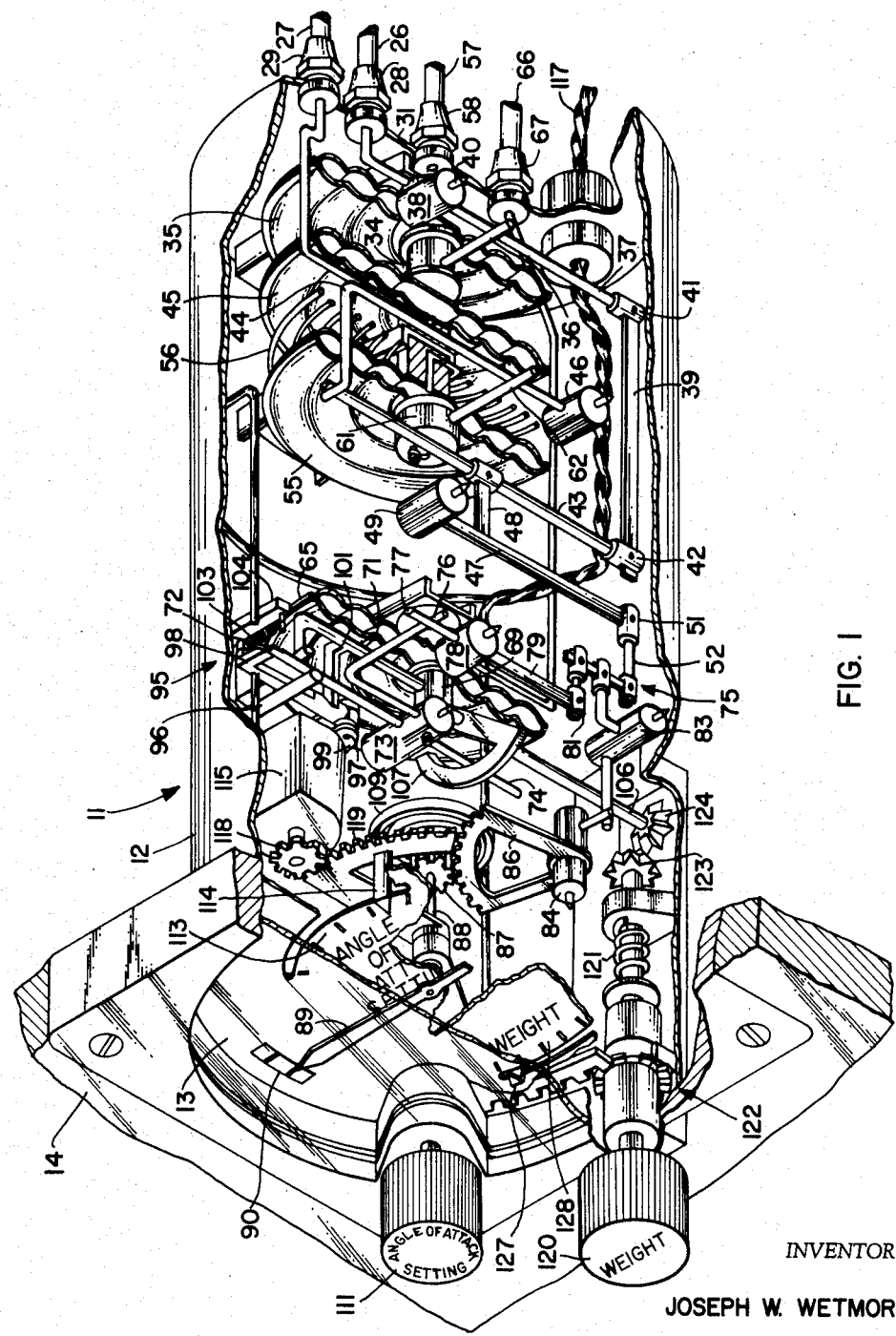
FIG. 1 is a perspective view of an aircraft instrument according to the present invention with parts in section and parts omitted for clarity.
Figure 2:
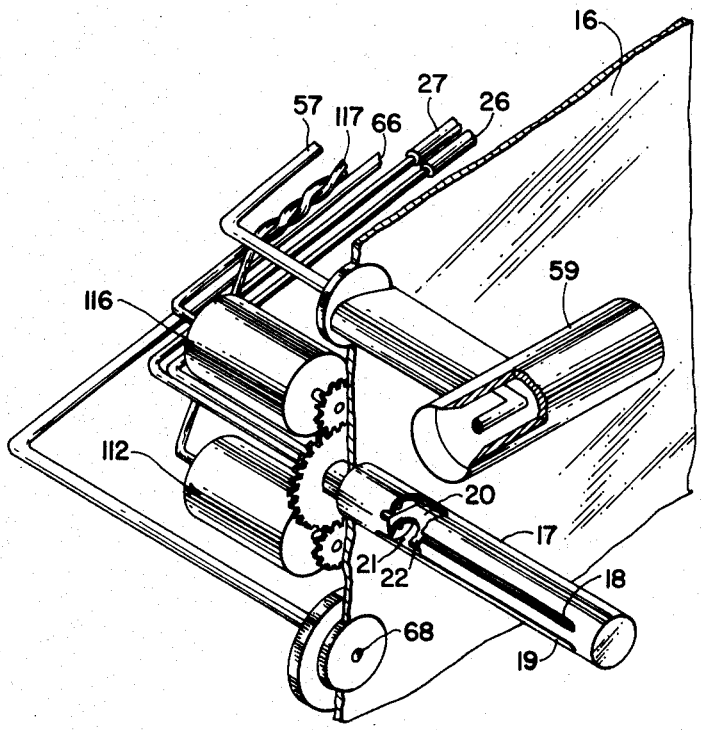
FIG. 2 is a perspective view of the pressure-source mechanism externally positioned on the aircraft fuselage and showing the conduit leads to the instrument illustrated in FIG. 1, as well as showing the mechanism for adjusting the angle-of-attack head.

Referring now to the drawings, wherein like reference numerals designate like or corresponding parts throughout the several views, and more particularly to FIGS. 1 and 2, there is shown the instrument, generally designated by reference numeral 11, employed in accordance with this invention.

Instrument 11 includes a housing 12 which is hermetically sealed, and provided with a viewing window 13. Housing 12 is appropriately attached in a conventional manner to instrument panel 14 of an aircraft 16 (FIG. 2). As shown in FIG. 2, the primary sensing means of the present instrument is an angle-of-attack sensing head 17, cylindrical in form and projecting laterally from the side of the aircraft fuselage 16 into the airstream. Sensing head 17 contains two narrow slots, designated by reference numerals 18 and 19, arranged parallel to the axis of the cylinder and spaced from about 60° to about 90° apart along the circumference of the cylinder. Slots 18 and 19 extend throughout the major portion of the cylinder length while constituting only a relatively minor portion of the circumferential area of sensing head 17. Slots 18 and 19 merge, respectively, with a pair of chambers or cavities 20 and 21, which are formed within sensing head 17 by a partition member 22, with the respective cavities being in fluid communication with flexible conduits 26 and 27, as will be further explained hereinafter. Conduits 26 and 27 lead to the interior of instrument housing 12 through suitable conventional seals 28 and 29, respectively, at the base 31 of instrument housing 12. The conduits then connect to the interior of each of two pressure-responsive aneroid units, designated by reference numerals 35 and 45 (FIG. 1), which are fixedly mounted within instrument housing 12.

Aneroid units 35 and 45 consists of identical flexible diaphragm wall cells each having the center of one wall rigidly mounted whereas the center of the other wall is movable by reason of the flexibility of both walls. Units 35 and 45 are arranged so that the movable faces of each are positioned adjacent to one another and rigidly connected to each other by a tie bar 34. It is thus seen that with the airstream direction disposed perpendicularly to the cylinder or sensing head 17, at a point on the circumference midway between slots 18 and 19, that the pressure exerted by the airstream at these openings will be equal, but for any other direction of the airstream component, the pressures will be different to thereby provide the angle-of-attack sensing capability for instrument 11. The air pressures received by slots 18 and 19 pass through conduits 26 and 27 to the interior of aneroid units 35 and 45 which, with the movable faces being rigidly connected by tie bar 34, move in response to, and in proportion to, any differences in pressure in the cell interiors to thereby respond definitely to variations in the airflow angle of attack at the angle-of-attack sensing head. More specifically, slot 18, as shown in FIG. 2, being connected through flexible conduit 26 to the interior of aneroid unit 35 serves to correlate decreases of pressure, at the same time that slot 19, conduit 27, and unit 45 respond to increases in pressure in the respective slots as a result of an increasing angle of attack, to move the pair of diaphragms of units 35 and 45 and their inner connection or tie bar 34 therebetween to the right as shown in FIG. 1, to thereby produce an input in instrument 11, the function of which will be further explained hereinafter.

A third flexible diaphragm cell or aneroid unit 55 (FIG. 1), similar in form and mode of operation to those described hereinbefore serves the function of a total-pressure-rate responsive unit, and is fixedly secured within instrument housing 12 adjacent to units 35 and 45 and spaced therefrom. A capillary tube 56 of suitable length and diameter opens into the interior of unit 55 with the other end of capillary tube 56 opening into the interior of instrument housing 12. The interior of instrument housing 12 is subjected to the total pressure of the airstream through a tube 57 leading to a total-pressure sensing head 59, of conventional design, suitably secured to the exterior of the aircraft fuselage 16 (FIG. 2). Tube 57 is sealed through base 31 of housing 12 by a conventional seal connection 58 and opens into the interior of housing 12. The movable wall of unit 55 is provided with a rigid boss 61 extending laterally therefrom to which is secured projection or arm 62, the function of which will be further explained hereinafter. When the total pressure varies, there will be flow through capillary tube 56 causing a pressure difference across the flexible diaphragm walls of aneroid unit 55 approximately proportional to the rate of change of total pressure, and thereby a movement of the movable wall also approximately proportional to rate of change of total pressure. An increasing total pressure, or positive total pressure rate, will thus cause a lower pressure to be exerted on the inner surfaces of the diaphragm of unit 55 than on the outer surfaces causing a movement of the movable diaphragm face and the attached boss 61 toward the right as shown in FIG. 1. A negative total pressure rate will give the opposite result with the movement of the movable diaphragm face toward the left, as shown in FIG. 1, the movements producing an input to the instrument as will be further described hereinafter.

A fourth pressure-responsive unit is part of a rotation programming unit which employs another aneroid cell 65 fixedly positioned in spaced relationship to and along the same longitudinal axis of the hereinbefore described aneroid units. The interior of aneroid unit 65 is designed to be subjected to the static or ambient pressure through a tubular member 66 leading through the base 31 of housing 12. Tubular member 66 is exteriorly sealed to base 31 by suitable seal 67 and leads to a static pressure orifice 68 positioned in the side of the fuselage 16.

The exterior of aneroid unit 65 is exposed to the total pressure existing within the interior of instrument housing 12 due to tubular connection 57 discussed hereinabove. The pressure differential between outside and inside of unit 65 is therefore dynamic pressure-proportional to the square of forward speed of the aircraft. The flexible diaphragm or movable face of aneroid 65 and the boss or projection 69 attached thereto move to the right as shown in FIG. 1 as aircraft speed increases, as does the arm 71 projecting upwardly from boss 69, as will be further explained hereinafter.

LINKAGE SYSTEM

The linkage system for transmitting output functions from the hereinbefore described pressure-responsive aneroid units 35, 45, 55, and 65 will now be described. As mentioned heretofore, aneroid units 35 and 45 have their respective flexible diaphragm walls facing and rigidly connected to each other by tie bar 34. Tie bar 34 is provided with a lateral extending arm 36 serving to normally abut or push against a link member 37. The upper end of link 37, as shown in FIG. 1, is rigidly secured to a freely pivotal cylinder or rocking drum 38 with the other end thereof connecting with a horizontal link 39 through pivot connection 41. Drum 38 pivotally rotates about an axis defined by its shaft 40, with shaft 40 being journaled at each end into a suitable bearing, such for example jewel bearings, not shown in the interest of clarity. Horizontal link 39 has at its other end a pivoted connection 42 joining with the end of a vertical lever 43. The opposite end of vertical lever 43 engages arm 44 in such manner that lever 43 may be moved by arm 44 as will be further explained hereinafter. Arm 44 has a ninety-degree curved extension, with the longer leg thereof in position to abut a projection 62 which extends from boss 61, and terminates in a rigid connection with freely pivotal cylinder 46. A vertically disposed link 47 is provided parallel to vertical lever 43 and has a branch 48 which pivotally connects to vertical lever 43 at a pivot point substantially intermediate the ends of vertical lever 43. One end of vertical link 47 is rigidly attached to a freely pivotal cylinder or rocking shaft 49 with the other end thereof terminating and connecting at pivot point 51 with rod 52.

Vertical link 47, extension 48, pivotal cylinder 49 and vertical lever 43 serve to amplify and sum the motions of the angle-of-attack responsive units 35 and 45, and the total-pressure-rate-responsive cell 55, in predetermined proportion as determined by the relative stiffnesses of the aneroid cells and the geometry of the linkage system. This sum is transmitted through rod 52 leading to a summation linkage, generally designated by reference numeral 75, as will be further explained hereinafter. The output of this portion of the instrument, or the movement of rod 52 may be determined by the relation:

$$\delta = K_1 \alpha - K_2 \dot{H}$$

where $\delta$ = the movement of rod 52
$\alpha$ = the angle of attack
$\dot{H}$ = rate of change of total pressure
$K_1$, $K_2$ = gain factors, determined by the characteristics of the instrument elements and the flight speed of the aircraft.

As mentioned heretofore, aneroid unit 65 provides the pilot with an indication that will tell him when to start and stop aircraft rotation at takeoff from the level attitude of the ground roll to the angle of attack required to lift off the ground at the proper speed. The input from aneroid unit 65 is fed to summation linkage 75 by way of boss 69 and its attached arm 71 which is in initial contact with the end of vertical lever 72. Vertical lever 72 is rigid with and extends upwardly, as shown in FIG. 1, from pivotal cylinder 73. Pivotal cylinder 73 is also provided with an integral depending arm 74, the function of which will be further explained hereinafter. Also provided on the same surface of pivotal cylinder 73 as vertical lever 72 is a curved arm member 76 which abuts against an extension 77 that extends from a freely pivotal cylinder or rocking shaft 78. Cylinder 78 is rigidly secured to a vertical arm 79 leading to summation linkage 75 by way of pivotal connection 81.

The output from summation linkage 75 is amplified and transmitted through positively connected rocking shafts 83 and 84 to a gear sector 86. Gear sector 86 is integral with rocking shaft 84 and coacts with a pinion 87 keyed to the indicator staff 88 and an indicator hand or pointer 89 is fixed on the end of shaft 88 and is adapted to point toward suitable indicia 90 provided on the dial face of the instrument housing 12, as will be further explained hereinafter.

LOCKOUT SYSTEM

Figure 5:
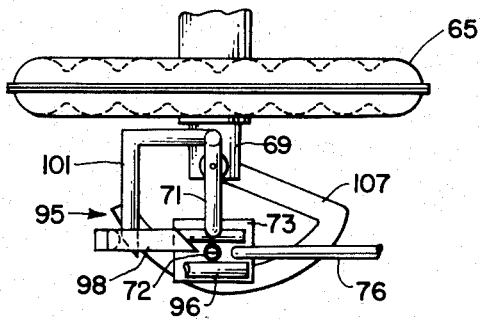
FIG. 5 is a top plan view of the mechanism shown in FIG. 3.
Figure 4:
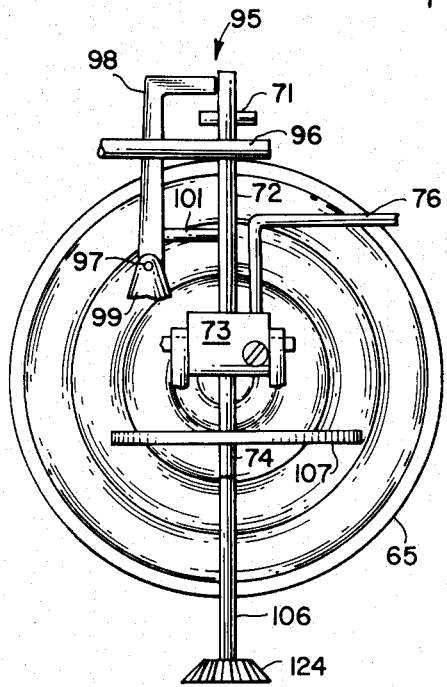
FIG. 4 is a front elevational view of the mechanism shown in FIG. 3.
Figure 3:
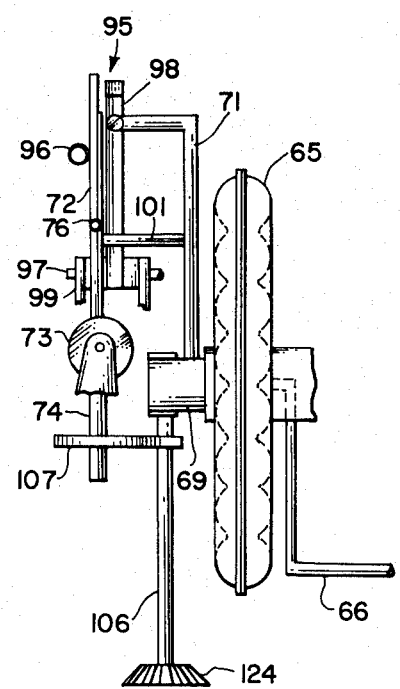
FIG. 3 is a side elevational view of a portion of the adjusting mechanism of the instrument shown in FIG. 1.

Referring now more particularly to FIGS. 3, 4, and 5, the mechanism designed to provide the pilot with means of performing consistent rotation and lift-off of the aircraft in take-off are illustrated. This mechanism includes a lockout system designed to lock the programming unit out of action during landing when the signal from this unit is not needed or wanted. The lockout system is generally designated by reference numeral 95 and includes a cylindrical stop 96 secured at one end to and extending from the interior of instrument casing or housing 12. Stop 96 serves to position and limit the movement of vertical lever 72, as will be further explained hereinafter. Vertical lever 72 is attached at one end thereof radially to rocking shaft 73 with the other end thereof terminating in essentially a half-cylinder segment having an arcuate and a flat surface area. Vertical lever 72 is urged into abutting relationship with stop 96 due to the slight spring tension exerted on the various elements of the system by hairspring 109. Hairspring 109, being disposed on indicator staff 88, also serves to prevent backlash between the various mechanical elements of the system while maintaining the components in operative contact with each other. An L-latch 98, having a tapered or cam face extension on the short leg thereof is journaled on bearing 97 carried by bracket 99 within instrument casing 12, with the tapered face of latch 98 normally abutting the arcuate surface of the end of vertical lever 72. A horizontally disposed L-shaped cam lever 101 is fixed to arm 71 and has a camming surface on the end thereof adapted to abut against latch 98.

A tension spring 103 having one end connected to a pin or extension on latch 98 and the other end thereof connected to a pin on a support member 104, which extends from the sidewall of instrument housing 12, is constructed and arranged so as to maintain latch 98 under tension, and in contact with vertical lever 72. A shaft 106, supporting a cam 107, projects downwardly from, and is journaled in, boss 69 for movement therewith. The cam 107 is angularly positionable, as well as displaceable with boss 69, to contact depending arm 74 of rocking shaft 73 at a predetermined aircraft speed to cause the direction of rotation of rocking shaft 73 to be affected. More specifically, the inner face of the cam 107 has a variable radius, about the shaft 106 on which it is mounted, so that by rotating this shaft the aircraft speed at which cam 107 engages arm 74 and takes control of it from arm 71 and, accordingly, the aircraft speed at which rocking shaft 73 is reversed in its motion for return to its original position, can be varied as desired. As will be explained hereinafter, the aircraft speed at which cam 107 engages depending arm 74 of rocking shaft 73 is the speed at which aircraft rotation should start and the speed at which rocking shaft 73 returns to its initial position against stop 96, which corresponds to the lift-off speed at which rotation to lift-off angle of attack would be completed. The ratio of the dynamic-pressure-at-start-of-takeoff rotation to dynamic-pressure-at-lift-off speed is determined by the relative distances from the axis of rocking shaft 73 to the points of engagement on the vertical lever 72 and depending arm 74 projecting therefrom.

The motion of rocking shaft 73 is amplified and transmitted, by the system of levers and links hereinbefore described, to the summing linkage 75 where this motion is summed with the motion produced in the links and levers leading from the other pressure variable inputs and then transmitted to the indicator or pointer 89 as hereinbefore described.

By manipulation of the aircraft controls, the pilot will thus endeavor to hold a fixed position for the point of indicator hand 89 on indicia 90 throughout the takeoff and climbout operation of his aircraft.

INSTRUMENT ADJUSTMENT

Two knobs are provided on the front of the instrument face to permit adjustments to the instrument by the pilot.

One of these knobs, designated by reference numeral 111 and marked "Angle-of-Attack Setting," operates the control of a servo-system generally designated by reference numeral 112 (FIG. 2) which rotates the angle-of-attack sensing head 17 in proportion to rotation of knob 111. Sensing head 17 is set to such position, before takeoff, that the output of summing linkage 75 will be null and thus cause no displacement of indicator hand 89 from its reference indicia 90 when the proper angle of attack and aircraft speed are attained for lift-off. It is to be understood that since conduits 26 and 27 are constructed of flexible material that the limited rotation of the sensing head will not affect the transmission of fluid pressure therethrough. A scale or index 113 (FIG. 1), marked off in units of angle of attack, is printed on the face of the instrument dial adjacent to a slot through which a cursor or pointer 114 projects to indicate the position to which the angle-of-attack sensing head has turned in response to movement of knob 111. It is also obviously within the scope of the present invention, if desired, to provide the movement of the angle-of-attack setting knob 111 to transmit, by direct gearing, movement of the cursor or pointer 114. However, for reasons of safety, in the preferred form of the present invention the cursor 114 is driven by a receiving unit 115 (FIG. 1) through gear 118 and gear segment 119, of the electrical self-synchronizing motor system 112; a transmitter unit 116 (FIG. 2) being connected to receiver unit 115 through electrical leads 117 for directing the location of the angle-of-attack sensing head 17.

The second knob on the instrument face, designated by reference numeral 120 and marked "Weight," when pressed in against spring 121, so as to engage a conventional type clutch mechanism, which is generally designated by reference numeral 122, causes integrally secured gear 123 to contact a like gear 124 provided on rotating shaft 106 to effect rotation of cam 107, and simultaneously causing the cursor 127 to move relative to the lower index or scale 128 which is marked off in units of aircraft weight. Due to the fact that takeoff rotation and lift-off speeds are directly related to aircraft weight for a given aircraft, the instrument is constructed and arranged so that, by setting cursor 127 by means of "Weight" knob 120 to point to a value on the weight index 128 representing the aircraft weight at takeoff, the cam 107 is simultaneously set to the position that will provide indication of the correct rotation and lift-off speeds for that weight.

The action of the rotation programing assembly in conjunction with the angle of attack and total pressure rate summing mechanism is further explained hereinafter.

OPERATION

As mentioned hereinbefore, prior to takeoff, the angle-of-attack sensing head 17 is set in such position that with the aircraft at the proper angle of attack and speed for lift-off, the output of summing linkage 75 is null and will cause no displacement of indicator hand 89 from the reference marker or indicia 90. However, during ground roll, that is, the period of acceleration up to rotational speed, the aircraft will be at an essentially constant and lower angle of attack than that for which the angle-of-attack sensing head is set. There will thus be a difference of pressure in aneroid units 35 and 45, proportional to the difference in angle of attack between ground roll and lift-off, and proportional to dynamic pressure, resulting in increasing displacement (rightward in FIG. 1) of rod 52. At the same time, the increasing dynamic pressure will act on the aneroid unit or pressure cell 65 of the "rotation programing assembly" giving an input motion (leftward in FIG. 1) to the summing linkage 75 which, at first, offsets the input from rod 52. The output motion of summing linkage 75 is therefore nulled and the indicator hand 89, being initially alined on reference indicia, remains zeroed or alined with the reference indicia 90 without any action required by the pilot of the aircraft.

When rotation speed is reached, however, the cam 107 engages the depending arm 74 of rocking shaft 73 thereby reversing the direction of the input motion, as airplane speed increases further. The pilot must then actuate the aircraft controls to increase the aircraft angle of attack, thereby reversing the motion of rod 52, to maintain zero output of summing linkage 75 and consequent continued alinement of indicator 89 with reference indicia 90. When aircraft speed has reached the desired lift-off speed, rocking shaft 73 will have returned to its zero or static position and will be restrained from further movement by stop member 96 as speed continues to increase. Rod 52 must therefore, also have returned to its initial zero position, if the indicator hand 89 is still zeroed and the aircraft will be at the angle of attack desired for lift-off. If, thereafter, the pilot continues to control the aircraft so as to keep indicator hand 89 zeroed on indicia 90, the aircraft will follow a smooth transition flight path to a steady climbout condition.

In order that the rotation programing assembly may be inactivated to permit use of the instrument during landing approach, the latch assembly 95 and its corresponding parts are provided, the operation of which is best followed by referring to FIGS. 3 to 5. As aircraft speed increases during the takeoff ground roll, the differential pressure cell or fourth aneroid unit 65, contracts in proportion to the square of ground speed. The boss 69 carried by the movable face of pressure cell 65 moves to the right (as shown in FIG. 3) and thereby moves arm 71 and rotatable shaft 106. Vertical lever 72 is held in contact with the end of arm 71 under the influence of the indicator staff coilspring 109 and is thereby caused to move away from stop member 96 and rotate clockwise, as viewed in FIG. 3, about the axis of rocking shaft 73. At a certain speed, or rotation speed, governed by the position of cam 107, which in turn is controlled by rotation of rotating shaft 106, the depending arm 74 contacts the surface of cam 107. Since cam 107 is also being moved to the right by contraction of the fourth aneroid unit or differential pressure cell 65 with increasing aircraft speed, the vertical lever 72 is caused to reverse its direction of rotation; that is, to commence rotating counterclockwise, with any further increase of speed, until at lift-off speed it is returned to its starting position against stop member 96. Curved arm 76, which projects upwardly from rocking shaft 73, duplicates the motions of vertical lever 72 and transmits these motions to the summing linkage 75 as described hereinbefore.

The lockout mechanism of the rotation programing unit is composed of latch 98, which rotates about a suitable bearing or pivot connection 99 with spring 103 applying a clockwise moment to latch 98 (FIGS. 1 and 4), and the L-shaped cam arm 101 which is rigidly fixed to arm 71. In the rest or zero speed condition, the cam arm 101 holds latch 98 out of contact with vertical lever 72. As aircraft speed increases during the takeoff ground roll, the pressure cell or aneroid unit 65 contracts in proportion to the square of speed causing arm 71, cam arm 101 and shaft 106 to move to the right (FIG. 3). Vertical lever 72, which is held in contact with the end of arm 71 by the action of indicator staff coilspring 109 or by an auxiliary spring, not shown, is thereby caused to move away from stop 96 and rotate clockwise about the axis of rocking shaft 73. This allows spring 103 to move latch 98 clockwise in such a way that its extremity moves in behind, or to the left of vertical lever 72 as viewed in FIG. 3.

At a certain aircraft speed, or rotation speed which is governed by the position of cam surface 107, which in turn is controlled by rotation of shaft 106, the depending arm 74 engages cam surface 107. Since cam surface 107 is also being moved to the right, by contraction of cell 65 as aircraft speed increases, vertical lever 72 is then caused to reverse direction of rotation or rotate counterclockwise. The instrument parts are so constructed and arranged that when vertical lever 72 rotates counterclockwise, by the action of cam 107, it moves back toward stop member 96 and engages the tapered or cam face extension on latch 98 forcing the latch back against its spring 103 until, when lever 72 is against stop 96, it has cleared the latch. Spring 103 then forces latch 98 to move in front of vertical lever 72 and engages the flat surface thereon to lock it in position against stop 96. At this point, the aircraft has reached lift-off speed.

It will thus be noted that cam arm 101 is still held out of engagement with latch 98 since at this speed the aneroid unit 65 has forced arm 71 and cam arm 101 to the right (as viewed in FIG. 3). The latch 98 therefore holds vertical lever 72 against stop 96 throughout the flight and landing until during the attainment of required low-landing touchdown speed, the aneroid unit or cell 65 will have returned far enough toward its rest position that cam arm 101 again engages latch 98 and forces it back out of engagement with vertical lever 72 preparatory to the next takeoff, wherein the cycle of operation would be repeated during the next takeoff run of the aircraft.

As is obvious to those skilled in the aircraft instrumentation art, various means for damping and mass balancing the various elements of the herein described instrument to avoid excessive response of the indicator hand 89 to vibrations, are considered an essential part of this instrument. Also, all the various rotating parts, such for example as described hereinbefore for cylinder 38, are provided with suitable bearings supported by conventional supports attached to the instrument housing interior. Such means are well known in the art and have been omitted in the illustration and description herein in the interest of clarity.

MODIFICATION

Referring now to FIG. 6, a schematic diagram of a modification of the hereinbefore described instrument is shown, and wherein similar or like elements are designated by like reference numerals and need not be further described. The embodiment illustrated in FIG. 6 operates on the same principles as the system described hereinbefore with the major difference being that the transmission and summing of the various outputs of the pressure-responsive cells is performed electrically rather than mechanically, with the electric power being supplied by suitable source 130. The various pressure-responsive units of this embodiment are each enclosed in separate hermetically sealed containers within instrument housing 12. That is, the individual units are sealed except for the tubular conduit connection from the appropriate pressure sources and the required electrical connections as will be further explained hereinafter. It is also, obviously, within the scope of this invention to provide the various units in separate locations within the aircraft without requiring them to be enclosed within the same instrument housing.

The angle-of-attack responsive unit of this embodiment includes compartment 131 having the interior thereof connected to the upper slot of an angle-of-attack sensing head 17 (identical to that described hereinbefore), by way of tubular conduit 133, and the interior of the contained aneroid cell 132 being connected to the lowermost slot of sensing head 17 by way of conduit 135. Aneroid unit 132 is so constructed and arranged that an increase in angle of attack above that for which the sensing head 17 is set initially, or the null position, causes movement of the flexible diaphragm face of cell 132 to the right as viewed in the schematic illustration of FIG. 6. A linkage 134 is attached to the movable face of cell 132 and serves to actuate the movable arm 137 of a potentiometer designated by reference numeral 138. Potentiometer 138 is connected in series with a Wheatstone bridge circuit 140 provided in casing 168 and constructed so that movement of variable arm 137 due to an increase in aircraft angle of attack causes an increase in resistance in arm 141 of the bridge circuit 140. Obviously, in a decrease in aircraft angle of attack, the resistance in arm 141 would also be deceased, as will be further explained hereinafter.

The total-pressure-responsive-unit compartment, designated by reference numeral 148 has an aneroid cell 151 fixedly attached therein with the exterior of cell 151 being subjected to a total pressure sensing head 59 by way of conduit 153. The movable face of aneroid cell 151 has a linkage or movable arm 154 attached thereto in pivotal connection with a movable arm 155 of a potentiometer 156. Potentiometer 156 is also connected in series with Wheatstone bridge circuit 140. The total pressure encountered by the aircraft is transmitted to the interior of aneroid cell 151 through a suitable capillary tube 56, as in the previously described embodiment, so that an increasing total pressure of positive total-pressure-rate, will cause the aneroid cell 151 to move the linkage or arm 154 to the left as shown in FIG. 6 and thereby through the associated potentiometer 156 cause an increase in resistance in the arm 142 of the Wheatstone bridge circuit 140. As seen in the schematic diagram of FIG. 6, arm 142 of bridge 140 is adjacent to arm 141 which is associated with the angle-of-attack unit. The result is a voltage across the output terminals at the bridge circuit 140 which may be described by the relation:

$$V = K_1 \alpha - K_2 \dot{H}$$

Wherein $V=$ the bridge output voltage;
$\alpha=$ the angle-of-attack indication;
$\dot{H}=$ the total pressure rate; and,
$K_1$ and $K_2=$ constants having suitable prescribed values determined by pressure cell-stiffness, linkage arrangement, and potentiometer resistance characteristics.

The rotation programing unit of the embodiment illustrated in FIG. 6 comprises compartment 158 having the interior thereof connected to static pressure source 68, by way of conduit 159, and containing an aneroid pressure cell 161. The interior of pressure cell 161 is connected to the total pressure sensing head 59 through tubular member 162. Two potentiometers 164 and 165 are connected to aneroid cell 161 through a suitable linkage system, generally designated by reference numeral 167, serving to control movement of the respective movable arms of the two potentiometers in relation to the movement of the movable face of pressure cell 161. Potentiometer 164 is connected in series with resistance arm 144 of bridge circuit 140 and provides an increasing resistance in arm 144 as aircraft speed increases during the takeoff ground run. The increasing resistance in arm 144 balances out the effect of the decreasing resistance in arm 141 which is simultaneously occurring due to the lower angle of attack of the aircraft in the ground run, relative to the setting of the angle-of-attack sensing head 17 which has been initially set for lift-off angle of attack. Potentiometer 165, which is connected in series with arm 143 of bridge circuit 140 is arranged so that when the aircraft reaches rotation speed it will provide a resistance increasing at a suitably greater rate than that of the potentiometer 164. Thus, when the aircraft reaches lift-off speed the resistance change in potentiometers 164 and 165 will be equal and their combined effect on the bridge output will be null. In the interval between rotation speed and lift-off speed, therefore, the pilot will have to increase the aircraft angle of attack to keep the bridge circuit 140 in balance and the output voltage zeroed. As a result, at lift-off speed the aircraft will be at the required angle of attack.

The speed or dynamic pressure at which potentiometer 165 begins to cause an increasing resistance is the aircraft rotation speed and can be adjusted in relation to the take-off weight of the aircraft by means of the "Weight Adjustment Knob" 120 which actuates a suitable adjustment mechanism, designated by reference numeral 169. Adjustment mechanism 169 varies the dynamic pressure or aircraft speed at which potentiometer 165 begins its increasing resistance to a value appropriate to the aircraft weight at which a particular takeoff is to be made. The adjusting of knob 120 also actuates a suitable weight index, not shown, similar to that described in the previously described embodiment.

A stop mechanism is provided to halt the action of the rotation programing unit enclosed in compartment 158 at the same time that the output of this unit is nulled at lift-off speed. This stop mechanism includes a pivoted arm 171, which, due to the construction of linkage 167, is driven by the aneroid cell 161 at a slower angular rate than the movement of the movable arm of potentiometer 165. The adjustable arm 166 of potentiometer 165 is controlled by the weight adjusting knob 120 and adapted to engage pivotal arm 171 at the desired lift-off speed to thereby prevent further motion of the movable arms of potentiometers 164 and 165 driven by the pressure cell 161 through linkage 167. When it is desirable to use the angle-of-attack, total-pressure-rate combination for landing approach, suitable provisions may be made to short-circuit the rotation programing unit contained in compartment 158 as soon as lift-off speed is reached and holding it in this position until aircraft speed becomes zero again, at which time it could be restored to active condition. The deactivating and reactivating of this unit could be accomplished automatically by a suitable conventional system of microswitches and relays which are not shown, but are well known to those skilled in the art.

The indicator for the embodiment illustrated in FIG. 6, consists essentially of a voltmeter or galvanometer driven by the output voltage from bridge circuit 140 which in turn drives indicator hand 89 on the instrument face. As seen in FIG. 6, indicator hand 89 points toward reference indicia 90 which is the position at which the indicator hand 89 should be held by suitable control of the aircraft by the pilot during the takeoff run and climbout as well as during all other flight conditions, in which the system might be used, such for example as in cruising and in landing approach.

An angle-of-attack adjusting knob 111 is provided at the indicator unit face for adjusting the angle-of-attack sensing head 17 to the position corresponding to the desired aircraft angle of attack, with the adjusting mechanism being the same or similar to that previously described and including a servo-motor system for locating the sensing head 17. A scale 113 is provided on the dial with cursor or pointer 114 relatively movable therewith to indicate the aircraft angle of attack corresponding to the setting of the angle-of-attack sensing head.

It is thus seen that in each of the herein described embodiments of the invention that an instrument has been invented that will enable the pilot of an aircraft to control his aircraft, in the vertical plane throughout the takeoff roll, rotation to lift-off angle of attack and climbout, by referring to a single indicator as compared to the multiplicity of indicators which must be used in present-day aircraft operation. The use of this instrument is not meant to imply that all other instruments normally used in aircraft operation are to be completely ignored. On the contrary, the well-trained pilot is taught to scan constantly all the pertinent aircraft instruments, but when he is flying by use of the instrument of the present invention he needs to make corrections through the aircraft controls only as called for by this single instrument and the other instruments will then indicate the desired readings as they are scanned.

Referring now back to FIG. 1, the theoretical development leading to the use of pressure sensing devices to produce the combined signal for angle of attack and rate of change of total pressure, and the relative sensitivities required in combining these measurements to provide phugoid damping, will now be explained. The output or signal from angle of attack units 35 and 45 and rate of change of total pressure unit 55 corresponds to angle of attack minus a given amount of rate of change of total pressure as indicated by the expression, $\alpha - K\dot{H}$.

The angle-of-attack measurement, as discussed hereinbefore, comes from cylindrical sensing head 17 mounted with its axis horizontal and perpendicular to the airstream with slots 18 and 19 located angularly apart on the upstream face thereof. Thus, when the angle of the airstream component is such that it bisects the angle between the orifices, the slot pressures $p_l$ and $p_u$ are equal. The angular deviation $\Delta\alpha$ of the wind component from this position is given by the following relation, which is based on the theoretical flow past a circular cylinder in a uniform stream:

$$p_l - p_u = 8_q \Delta\alpha = p_a$$

where: $q$ = dynamic pressure.

When the cylinder 17 is mounted laterally from the side of a fuselage of near-circular cross section the indicated value of $\Delta\alpha$ will be about 1.5 times the actual value because of the cross flow around the fuselage and the resultant change in local flow direction. Values of $p_a$ are independent of dynamic pressure only when this device is used as a null-seeking instrument whereby the angular position of the "nulled" cylinder is equivalent to the angle of attack. The cylindrical sensing head 17 is preset to some desired angle $-\alpha_0$ such that it is nulled when the airplane is rotated to the proper angle ($\Delta\alpha = \alpha + \alpha_0$).

The method of measuring total-pressure rate is similar to the method used for a rate-of-climb meter and is based on the measurement of the pressure difference across capillary 56 connecting the total pressure H and the pressure in a fixed volume $p_Q$, as shown in the following relation:

$$H = q + p$$

where:

$H$ = total pressure
$p$ = static pressure
$P_Q$ = pressure in volume Q
$q$ = dynamic pressure $$\tau D P_Q = H - P_Q$$

$$H - P_Q = \frac{\tau DH}{1 + \tau D} = P_{\dot{H}} \qquad (1)$$

where:

$P_{\dot{H}}$ = pressure sensed by unit 55

$D$ = operator $\dfrac{d}{dt}$ $\tau$ = time lag $\dfrac{8\mu lQ}{\pi r^4 H}$ $\mu$ = viscosity of air in capillary
$l$ = length of capillary tube
$Q$ = volume of chamber
$r$ = radius of capillary tube The pressure signals sensed by the pressure measuring devices, i.e., units 35 and 45 and unit 55, are combined to give an instrument reading, $\delta$, as follows:

$$\delta = K_1 p_a - K_2 P_{\dot{H}} \qquad (2)$$

where $K_1$ and $K_2$ are constants determined by the sensitivities of the aneroid pressure cells 35, 45, and 55, respectively, and the linkage system of the instrument with the ratio $K_2/K_1$ establishing the amount of phugoid damping. The relation between rate-of-change of total pressure and aircraft motion is given by the following expression:

$$\frac{dH}{dt} = \frac{dq}{dt} + \frac{dp}{dt} = \rho V \frac{dV}{dt} - \rho g \frac{dh}{dt} = V \frac{dq}{ds} - \rho g V \gamma$$

where:
$p$ = static pressure
$\rho$ = density of air
$s$ = distance along flight path
$V$ = flight-path velocity
$\gamma$ = flight-path angle Or for convenience, using the nondimensional notation $$q_* = \frac{q - q_{lo}}{q_{lo}} = \frac{\Delta q}{q_{lo}}$$

$$s_* = \frac{\rho g}{q_{lo}} s \text{ and } D_* \frac{d}{ds_*}$$

where subscript $lo$ refers to lift-off condition, we have:

$$DH = \rho g V (D^* q^* - \gamma)$$

Equation 1 may be expressed as follows, for low frequency motion such as in the phugoid oscillation and with the time constant $\tau$ small compared to the motion frequency $$P_H = \tau DH$$

Equation 2 then becomes $$\delta = K_1 8 q \Delta \beta - K_2 \tau \rho g V (D^* q^* - \gamma)$$

and $$\Delta \alpha = \frac{\delta}{K_1 8_q} + \frac{K_2 \tau \rho g V}{K_1 9_q} (D_* q_* - \gamma)$$

or substituting the symbols $X$ and $\epsilon$ for the fractional function gives $$\Delta \alpha = X + \epsilon (D^* q^* - \gamma) \quad (3)$$

The linearized perturbation equations of motion for the phugoid mode in the vertical plane only may be expressed in the following form:

$$(D^* + c) q^* + \gamma = b - e \Delta \alpha \quad (4)$$
$$-1/2 q^* + D^* \gamma = 1/2 a \Delta \alpha \quad (5)$$

where $$a = \frac{C_{L_\alpha}}{C_{L_{lo}}}, \left(\frac{\text{lift curve slope}}{\text{lift coefficient at lift-off}}\right)$$

$$b = \frac{T_{ex}}{W}, \left(\frac{T-D}{W}\right)_{lo}, \left(\frac{\text{thrust-drag}}{\text{weight}}\right) \text{ at lift-off}$$

$$c = \left(\frac{C_D}{C_L}\right)_{lo}, \left(\frac{\text{drag coefficient}}{\text{lift coefficient}}\right) \text{at lift-off}$$

$$e = \left(\frac{C_{D_\alpha}}{CL}\right)_{lo}, \left(\frac{\text{drag curve slope}}{\text{lift coeffiicient}}\right) \text{at lift-off}$$

Eliminating $q^*$ and adding Equations 4 and 5 yields $$(D^{*2} + cD^* + 1/2) \gamma - 1/2 a \Delta \alpha D^* - 1/2 [b - \Delta \alpha (e - ac)] = 0 \quad (6)$$

If the aircraft is flown so that an angle-of-attack indicator is held constant and equal to the angle of attack at lift-off ($\Delta \alpha = 0$) then Equation 6 reduces to the following differential equation:

$$(D_*^2 + cD_* + 1/2) \gamma = \frac{b}{2} \quad (7)$$

whose roots are of the form $\lambda_{1,2} = \alpha \pm i\beta$ where $$\alpha = -\frac{c}{2}$$

is the damping or exponential decay term and $$\beta = \sqrt{1/2 - \left(\frac{c}{2}\right)^2} = \sqrt{1/2 - 1/4 \left(\frac{C_D}{C_L}\right)_{lo}^2}$$

is the spatial angular frequency of the oscillation in terms of $s^*$. For the exemplary aircraft considered herein, $$\frac{C_D}{C_L} = 0.178$$

and $$V_{lo} = 313 \text{ ft./sec.}$$

With these values it is found that the oscillations have a period of 40 seconds and a damping ratio $$\left(\frac{\text{damping}}{\text{critical damping}}\right)$$

$\sigma$ of 0.125. That is, with the use of angle-of-attack alone as a pilot's reference, a long-period, poorly damped oscillatory flight path will follow take-off.

If the aircraft is to be controlled by means of the instrument described hereinbefore as represented by Equation 2, the equations of motion may be written by substituting Equation 3 in Equations 4 and 5:

$$(D^* + c) q^* + \gamma = b - e[X + \epsilon(D^* q^* - \gamma)] \quad (8)$$
$$-1/2 q^* + D^* \gamma = 1/2 a [X + \epsilon(D^* q^* - \gamma)] \quad (9)$$

The aircraft is to be controlled so that the instrument reading described remains constant ($\delta$ = constant). $X$ and $\epsilon$ will be nearly constant and for this simplified analysis are assumed constant. Then the simultaneous solution of Equations 8 and 9 gives $$\left\{ D_*^2 + \left(\frac{a\epsilon + c}{1 + e\epsilon}\right) D_* + 1/2 \left[\frac{1 + \epsilon(ac - e)}{1 + e\epsilon}\right] \right\} \gamma = 1/2 \left[\frac{b + X(ac - e)}{1 + e\epsilon}\right]$$

which is the same form as Equation 7. The damping term was previously equal to $$\left(-\frac{c}{2}\right) \text{ or } 1/2 \left(\frac{C_D}{C_L}\right)_{lo}$$

it now has the value $$\left[-1/2 \left(\frac{a\epsilon + c}{1 + e\epsilon}\right)\right] \text{ or } \left[-1/2 \left(\frac{C_{L_\alpha} \epsilon + C_{D_{lo}}}{C_{D_{\alpha_{lo}}} \epsilon + C_{L_{lo}}}\right)\right]$$

This expression contains the controllable factor $\epsilon$ (relative gain on total-pressure-rate input) which can be used to adjust the damping of the phugoid made to a desired value.

The damping ratio $$\sigma \left(\frac{\text{damping}}{\text{critical damping}}\right)$$

is then given by the relation:

$$\sigma = \frac{(a\epsilon + c)}{\sqrt{2(1 + e\epsilon)[1 + \epsilon(ac - e)]}} \quad (10)$$

It was found in the present investigation that a value of $\sigma$ taken to be 0.707 would provide satisfactory damping of the phugoid oscillations. To illustrate the determination the system gains, Equation 10 was solved with a positive value of $\epsilon$ that would give this value with the following values of $a$, $c$, and $e$ representative of an actual aircraft.

$a = 4.16$
$c = 0.178$
$e = 1.00$

The value of $\epsilon$ was found to be 0.215 to have 0.7 critical damping of the phugoid mode. Assuming the P_H sensing device 55 to be constructed so that $\tau$ has a value of one second, which appears reasonable, and substituting values of V and q which are representative of the take-off operating range of the aircraft, the relative sensitivity of the pressure sensing devices was determined.

$$\epsilon = \frac{K_2 \tau \rho g V}{K_1 8q} = 0.215$$

$$\frac{K_2}{K_1} = 8.2$$

Obviously, many modifications and variations of the present invention are possible in the light of the above teachings. It is therefore to be understood that within the scope of the appended claims, the invention may be practiced otherwise than as specifically described.

What is claimed and desired to be secured by Letters Patent of the United States is:

1. An aircraft instrument comprising:
   single indicator means to indicate optimum aircraft operation during takeoff roll, rotation and climb,
   a plurality of pressure-responsive means in operative relationship with said indicator means,
   pressure-sensing means in individual operative connection with each of said pressure-responsive means,
   said pressure-responsive means being individually responsive during aircraft operation to pressure variables sensed by said pressure-sensing means as caused by changes in aircraft angle of attack, total pressure, and dynamic pressure,
   means connected to said single indicator means for so combining the outputs of said pressure responsive means into a resultant output function that as the respective outputs of said angle-of-attack pressure responsive means and said total pressure rate responsive means increase each contributes in a constant sense to said resultant output function, and as the output of said rotation programing pressure responsive means increases it first contributes to the resultant output function in one sense and after reaching a settable value contributes to the resultant output function in the reverse sense, such that during essentially optimum aircraft operation during takeoff roll, rotation and climbout, said output function will be essentially nulled,
   whereby the aircraft pilot by controlling the aircraft to maintain a substantially fixed reading by said single indicator means during aircraft operation will cause the aircraft to rotate to takeoff attitude at the proper speed, and thereafter to follow a near-optimum climbout path.

2. An instrument for use with a piloted aircraft comprising: single indicator means to indicate optimum aircraft operation during takeoff roll, rotation and climb, a plurality of pressure-responsive means in operative relationship with said indicator means, pressure sensing means in individual operative connection with each of said pressure-responsive means, said plurality of pressure-responsive means including an angle of attack responsive unit, a total-pressure-rate responsive unit and an aircraft rotation programing unit, said units being individually and respectively responsive during aircraft operation to pressure variables sensed by said pressure sensing means as caused by changes in aircraft angle of attack, total pressure, and dynamic pressure; means connected to said single indicator means for so combining the outputs of said units into a resultant output function that as the respective outputs of said angle-of-attack responsive unit and said total-pressure-rate responsive unit increase, each contributes in a constant sense to said resultant output function, and as the output of said rotation programing unit increases it first contributes to the resultant output function in one sense and after reaching a settable value contributes to the resultant output function in the reverse sense, such that upon essentially optimum aircraft operation during takeoff roll, rotation and climbout, the output function derived will be essentially equal to zero and the pilot, by controlling the aircraft, to maintain a substantially fixed reading by said single indicator means during aircraft takeoff, will cause the aircraft to rotate to takeoff attitude at the proper speed and thereafter to follow a near-optimum climbout path.

3. An instrument according to claim 2 wherein said total-pressure-rate responsive unit includes:
   means adjustable by the aircraft pilot prior to takeoff to compensate the instrument for varying aircraft weight,
   an aneroid cell, said cell being interiorly subjected to an ambient pressure source on the aircraft fuselage and exteriorly subjected to total pressure, and
   a lockout mechanism for locking said rotation programming unit out of action between takeoff and landing aircraft operations.

4. An instrument according to claim 3 wherein said lockout mechanism includes a boss secured to the movable face of said cell, an arm extending from said boss, a rotatable shaft journaled within said boss, means on said rotatable shaft forming an adjustable cam surface, a rocking shaft providing the output of said rotation programming unit and positioned in spaced adjacency with said boss and having a depending arm journaled therein, said depending arm being positionable to contact said cam surface, a lever extending from said rocking shaft and terminating in a half-cylindrical portion, stop means limiting rocking movement of said rocking shaft by engagement with said lever, an L-latch extending from a pivot connection on said housing, the free end of said L-latch terminating in a diagonal cam surface, tension means acting on said L-latch biasing the cam surface thereon adjacent the arcuate surface of said half-cylindrical portion of said lever, an L-shaped cam rigid with said arm that extends from said boss with the cam surface thereon normally abutting said L-latch to thereby maintain said L-latch out of binding contact with said arcuate surface whereby as aircraft speed increases during ground roll, said cell contracts in proportion to the square of speed causing movement of said arm extending from said boss, said L-shaped cam and said rotatable shaft in a first direction thereby permitting rotational motion of said rocking shaft proportional to cell contraction and causing said depending arm thereon to engage said adjustable cam surface, which is also being moved by said cell as predetermined aircraft rotational speed is reached, engagement of said depending arm with said adjustable cam surface effecting reverse rotation of said rocking shaft whereupon said lever rotates beyond said L-latch and said tension means moves said L-latch in position to engage the flat surface of said half-cylindrical lever portion to thereby lock said rotation programing unit out of action.

5. A pressure responsive instrument for monitoring takeoff and landing of a piloted aircraft including a plurality of pressure sensing means for sensing pressure changes characteristic of changes in aircraft angle of attack, total pressure, and static pressure, said plurality of pressure sensing means including a differential-pressure-to-displacement transducer, said transducer including an aneroid cell, said aneroid cell being provided with a fixed and a movable face, said aneroid cell having the interior thereof connected through a conduit to a static source and the exterior of said cell being exposed to total pressure to thereby provide a pressure differential function proportional to the square of forward aircraft speed, transmitting means for transmitting said function and including a boss attached to said movable face of said cell, an arm extending from and movable with said boss, said arm having a curved end portion, a rocking shaft disposed in said housing and having a lever extending therefrom, said lever normally engaging said curved end portion, said rocking shaft also having a depending arm integral therewith, said depending arm being in position for engagement with means forming a cam surface, and means supporting and rotatably adjusting the position of said means forming the cam surface in relation to said depending arm to thereby place said rocking shaft in the desired angular position.

6. An aircraft instrument comprising: an instrument housing containing an angle-of-attack responsive unit, a total-pressure-rate responsive unit, and an aircraft rotation programing unit; each of said units including at least one aneroid cell, each of said cells having one centrally fixed and one movable flexible diaphragm wall, connecting means secured to each of said movable walls for movement therewith, transmitting means in connection with each of said connecting means for transmitting a function of pressure change as indicated by said cells, amplifying means to amplify the function of pressure change transmitted by said transmitting means, means for receiving and combining the output functions of said units into a single function such that as the respective outputs of said angle-of-attack responsive unit and said total pressure rate responsive unit increase, each contributes in a constant sense to said resultant output, and as the output of said rotation programing unit increases it first contributes to the resultant output function in one sense and after reaching a suitable value contributes to the resultant output function in the reverse sense, means for transmitting the combined output function from said means for receiving and combining the output functions, indicator means for receiving and indicating said combined output function, whereby the pilot of an aircraft employing said instrument by manipulating the aircraft controls so as to maintain a combined zero output from said units will cause the aircraft to rotate to takeoff attitude at the proper speed and thereafter to follow a near-optimum climbout path.

7. An instrument for use with a piloted aircraft comprising: single indicator means to indicate optimum aircraft operation during takeoff roll, rotation and climb, a plurality of pressure-responsive means in operative relationship with said indicator means, pressure-sensing means in individual operative connection with each of said pressure-responsive means, said plurality of pressure-responsive means including an angle-of-attack responsive unit, a total pressure-rate responsive unit and an aircraft rotation programing unit, said units being individually and respectively responsive during aircraft operation to pressure variables sensed by said pressure-sensing means as caused by changes in aircraft angle of attack, total pressure, and dynamic pressure, means for combining the outputs of said units into a resultant output function so that as the respective outputs of said angle-of-attack responsive unit and said total pressure rate responsive unit increase, each contributes in a constant sense to said resultant output, and as the output of said rotation programing increases it first contributes to the resultant output function in one sense and after reaching a suitable value contributes to the resultant output function in the reverse sense, to thereby result in a zero resultant function during optimum aircraft takeoff speed and rotation, said angle-of-attack response unit including a first and a second aneroid cell each having a centrally fixed flexible wall and a movable flexible wall, said movable wall being rigidly secured to each other in such manner that movement of either induces an equal and oppositely directed movement of the other movable wall, each with respect to the fixed wall of its respective cell, the interiors of said first and said second aneroid cells being in fluid communication through individual conduits with a cylindrical angle-of-attack sensing head, said angle-of-attack sensing head being secured on the exterior of the aircraft fuselage and being divided into a pair of chambers extending substantially along the length thereof and merging with a pair of slot openings also extending substantially along the cylinder length, said slot openings constituting a relatively minor portion of the sensing head circumferential surface area and being spaced apart around the circumference of said sensing means, said individual conduits terminating individually within respective ones of said chambers, whereby during aircraft operation with the airstream direction perpendicular to said sensing head at a point on its circumference midway between said slots the pressure exerted by the airstream and passed through said conduits will be equal to thereby maintain said movable walls immobile but for any other direction of the perpendicular airstream component the pressures will be different and cause positive movement of said movable walls.

8. An instrument for use with a piloted aircraft comprising:
 a normally balanced Wheatstone bridge,
 indicating means for indicating said Wheatstone bridge balance and unbalance,
 means for increasing the resistance in a first leg of said bridge proportional to the increase of the angle of attack of the aircraft during aircraft operation,
 means for increasing the resistance in a second leg of said bridge adjacent to said first leg proportional to the total pressure experienced by the aircraft,
 means for increasing the resistance in a third leg of said bridge opposite to said first leg and for increasing the resistance in a fourth leg of said bridge opposite said second leg proportional to the static pressure of the aircraft during aircraft operation,
 whereby by manipulating the aircraft controls so as to maintain said indicating means in the balanced position during aircraft operation the pilot will cause his aircraft to rotate to takeoff attitude at the proper speed and thereafter to follow a near-optimum climbout path.

9. The combination as in claim 8 including control means selectively movable by the pilot for engaging and adjusting said bridge prior to takeoff to compensate for varying aircraft weight said control means adjustment serving to vary the dynamic pressure at which an increase in resistance will commence in said fourth leg of said bridge.

10. An instrument for use within a piloted aircraft including, an instrument housing, indicator means within said housing being operably connected to a normally balanced electric bridge circuit and adapted to indicate any bridge unbalance, means for adjusting bridge balance prior to aircraft takeoff a plurality of pressure-responsive elements responsive to pressure changes characteristic of changes in aircraft angle of attack, total pressure, and static pressure, said pressure responsive elements being contained within said housing, each said pressure-responsive element having a fixed and a movable face, means connecting each said movable face to the movable arm of an individual potentiometer, each said potentiometer being in series with a resistance arm of said normally balanced electric bridge, means for adjusting one of said potentiometers to control the dynamic pressure at which said one potentiometer begins to influence the resistance of said bridge to thereby compensate for the specific aircraft weight, whereby the pilot of the aircraft employing said instrument, by controlling the aircraft speed and rotation during takeoff to maintain said bridge substantially balanced as indicated by said indicating means, will cause the aircraft to rotate to takeoff attitude at the proper speed and thereafter to follow a near-optimum climbout path.

11. An aircraft instrument comprising:
 a Wheatstone bridge,
 a plurality of pressure sensing means for sensing pressure changes characteristic of changes in aircraft angle of attack, total pressure, and static pressure, indicator means for indicating bridge balance and unbalance, a plurality of pressure-responsive means disposed within individual sealed compartments and in operative connection with said pressure-sensing means, said pressure-responsive means being individually responsive during aircraft operation to pressure variations sensed by said sensing means and caused by changes in aircraft angle of attack, rate of change of total pressure, and dynamic pressure, variable potentiometer means interconnecting said plurality of pressure-responsive means with individual legs of said bridge, said variable potentiometer means serving to correlate the pressure variations received by said plurality of pressure-responsive means, and means connecting said bridge to said indicator means whereby the aircraft pilot by controlling the aircraft to maintain said bridge balanced to produce a fixed reading of said indicator means during aircraft operation will cause the aircraft to encounter the desired pressure variations for rotation to take-off attitude at the proper speed, and thereafter to follow a near-optimum climbout path.

References Cited by the Examiner

UNITED STATES PATENTS

| | | | |
|---|---|---|---|
| 1,929,091 | 10/1933 | Colvin | 73—410 X |
| 2,029,700 | 2/1936 | Boykow | 73—182 X |
| 2,214,181 | 9/1940 | Rylsky | 73—179 |
| 2,275,719 | 3/1942 | Bevins | 73—179 |
| 2,363,143 | 11/1944 | Reichel | 73—182 |
| 2,411,484 | 11/1946 | Watter | 73—182 |
| 2,508,623 | 5/1950 | Shaefer | 73—182 |
| 2,645,123 | 7/1953 | Hundstad | 73/189 |
| 2,671,620 | 3/1954 | Andrews | 73—182 X |
| 2,701,474 | 2/1955 | Goudy | 73—189 |
| 2,736,199 | 2/1956 | Ibbott | 235—200 X |
| 2,799,164 | 7/1957 | Ruskin et al. | 73—182 |
| 2,960,098 | 11/1960 | Watrous | 235—200 X |
| 3,025,494 | 3/1962 | Andresen | 73—178 |
| 3,077,109 | 2/1963 | Gold | 73—178 |
| 3,104,315 | 9/1963 | Howard et al. | 235—179 X |

FOREIGN PATENTS

| | | |
|---|---|---|
| 175,656 | 6/1961 | Sweden. |

ROBERT B. HULL, *Primary Examiner.*